(12) United States Patent
Aparin

(10) Patent No.: US 8,135,348 B2
(45) Date of Patent: Mar. 13, 2012

(54) REJECTION OF TRANSMIT SIGNAL LEAKAGE IN WIRELESS COMMUNICATION DEVICE

(75) Inventor: Vladimir Aparin, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 845 days.

(21) Appl. No.: 11/691,737

(22) Filed: Mar. 27, 2007

(65) Prior Publication Data

US 2008/0242245 A1 Oct. 2, 2008

(51) Int. Cl.
*H04B 1/00* (2006.01)
*H04B 15/00* (2006.01)

(52) U.S. Cl. ........................ 455/63.1; 455/296

(58) Field of Classification Search .............. 455/24, 455/63.1, 67.11, 67.13, 67.14, 82–83, 115.1–115.3, 455/226.1–226.3, 278.1, 296
See application file for complete search history.

(56) References Cited

U.S. PATENT DOCUMENTS

| | | | | |
|---|---|---|---|---|
| 5,444,864 | A | * | 8/1995 | Smith .............................. 455/84 |
| 5,974,301 | A | * | 10/1999 | Palmer et al. ................. 455/63.1 |
| 6,567,649 | B2 | * | 5/2003 | Souissi ........................... 455/83 |
| 2005/0107051 | A1 | * | 5/2005 | Aparin et al. ................. 455/126 |
| 2006/0252398 | A1 | * | 11/2006 | Park et al. ..................... 455/296 |
| 2007/0082617 | A1 | * | 4/2007 | McCallister ................. 455/63.1 |
| 2009/0232260 | A1 | | 9/2009 | Hayashi et al. |

FOREIGN PATENT DOCUMENTS

| | | |
|---|---|---|
| SU | 24022 A1 | 11/1931 |
| WO | WO0217506 A1 | 2/2002 |
| WO | WO2006068635 | 6/2006 |
| WO | WO2007029429 A1 | 3/2007 |

OTHER PUBLICATIONS

International Search Report and Written Opinion—PCT/US2008/058101, International Search Authority—European Patent Office—Jun. 25, 2008.

* cited by examiner

*Primary Examiner* — Tuan A Tran

(74) *Attorney, Agent, or Firm* — Kenyon S. Jenckes; Ramin Mobarhan

(57) ABSTRACT

This disclosure describes techniques for reducing adverse effects of transmit signal leakage in a full-duplex, wireless communication system. The disclosure describes techniques for reducing adverse effects of second order distortion and cross-modulation distortion of transmit signal leakage from a transmitter via a duplexer. The techniques may be effective in rejecting at least a portion of a transmit leakage signal, thereby reducing or eliminating distortion. The adaptive filter may include an estimator circuit that generates a transmit leakage signal estimate. A summer subtracts the estimate from the received signal to cancel transmit leakage and produce an output signal. The estimator circuit generates the transmit leakage signal estimate based on a reference signal and feedback from the output signal. The reference signal approximates the carrier signal used to generate the transmit signal in the transmitter. The reference signal may be provided by the same oscillator used to produce the transmit carrier signal.

47 Claims, 14 Drawing Sheets

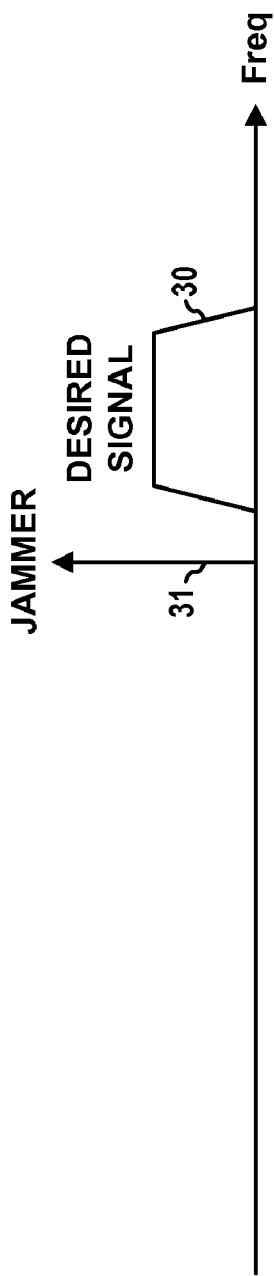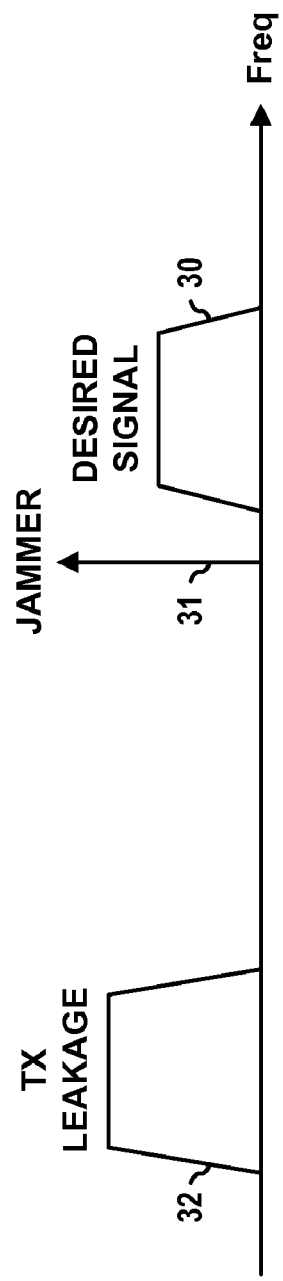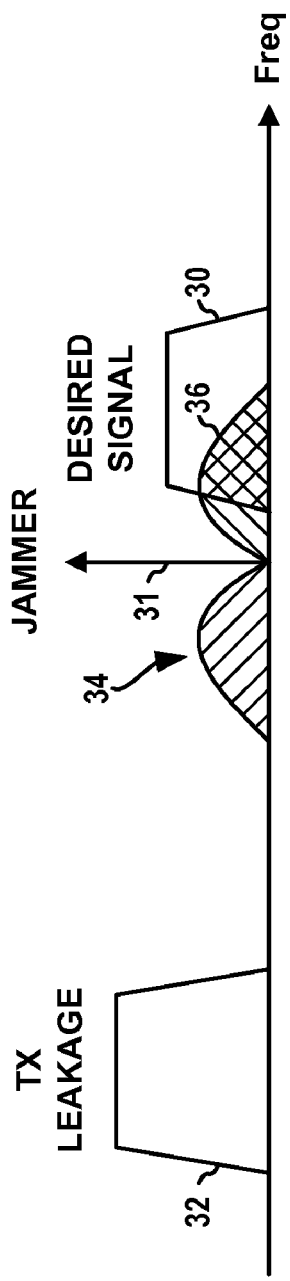

REJECTION OF TRANSMIT SIGNAL LEAKAGE IN WIRELESS COMMUNICATION DEVICE

TECHNICAL FIELD

This disclosure relates generally to wireless communication devices and, more particularly, to techniques for reducing adverse effects of transmit signal leakage in a wireless full-duplex communication system.

BACKGROUND

A wireless full-duplex communication system can simultaneously transmit and receive signals to support two-way communication. In a transmit path, a power amplifier amplifies a radio frequency (RF) signal for transmission. The transmit (TX) signal is routed through a duplexer and transmitted via an antenna. In the receive path, a desired receive (RX) signal is received via the antenna and coupled through the duplexer to a low noise amplifier (LNA). Following amplification by the LNA, the RX signal may be filtered and downconverted to baseband by a mixer. The down-converted RX signal is processed by other components to recover the received data.

In a full-duplex communication system, the transmit path can interfere with the RX path. A portion of the TX signal may be coupled from the duplexer to the RX path, resulting in TX signal leakage. TX signal leakage can cause interference in the desired signal processed by the RX path. The interference may include second order distortion and cross-modulation distortion (XMD). Because the transmitter frequency differs from the receiver frequency, the TX signal leakage can be filtered. However, even with filtering, there typically remains a residual amount of the TX signal leakage, causing potential degradation of the desired RX signal received via the antenna. The desired RX signal is the signal received via an antenna, in contrast to the TX signal received via leakage across a duplexer.

SUMMARY

In general, this disclosure describes techniques for reducing adverse effects of TX signal leakage in a full-duplex, wireless communication device. In particular, the disclosure describes techniques for reducing adverse effects of second order distortion and cross-modulation distortion (XMD) of TX signal leakage from a transmitter via a duplexer. The techniques may be effective in rejecting at least a portion of a TX leakage signal, thereby reducing or eliminating distortion of TX signal leakage in the RX path.

The disclosure provides, in various aspects, a filter circuit for a radio frequency (RF) receiver, the filter circuit comprising a summer that receives an RF receive (RX) input signal having a transmit (TX) leakage signal, and subtracts a TX leakage signal estimate from the RX input signal to produce an RX output signal, and an estimator that generates the TX leakage signal estimate based on the RX output signal and a reference signal at a carrier frequency of the TX leakage signal.

In other aspects, the disclosure provides a method for filtering a transmit (TX) leakage signal from a received input signal in a radio frequency (RF) receiver, the method comprising receiving an RF receive (RX) input signal having a TX leakage signal, subtracting a TX leakage signal estimate from the input signal to produce an output signal, and generating the TX leakage signal estimate based on the output signal and a reference signal at a carrier frequency of the TX leakage signal.

In additional aspects, the disclosure provides a radio frequency (RF) receiver, the receiver comprising an antenna that receives a receive (RX) input signal, a low noise amplifier that amplifies the RX input signal, a duplexer that couples the RX input signal from the antenna to the low noise amplifier, and passes a transmit (TX) leakage signal to the low noise amplifier as part of the RX input signal, a summer that subtracts a TX leakage signal estimate from the RX input signal to produce an RX output signal, an estimator that generates the TX leakage signal estimate based on the RX output signal and a reference signal at a carrier frequency of the TX leakage signal, and a mixer that downconverts the RX output signal to a baseband.

The details of one or more examples of the invention are set forth in the accompanying drawings and the description below. Other features, objects, and advantages will be apparent from the description and drawings, and from the claims.

BRIEF DESCRIPTION OF DRAWINGS

FIGS. 2A through 2C are frequency versus amplitude plots illustrating distortion of TX signal leakage within the RX path of the device of FIG. 1.

DETAILED DESCRIPTION

Figure 1:
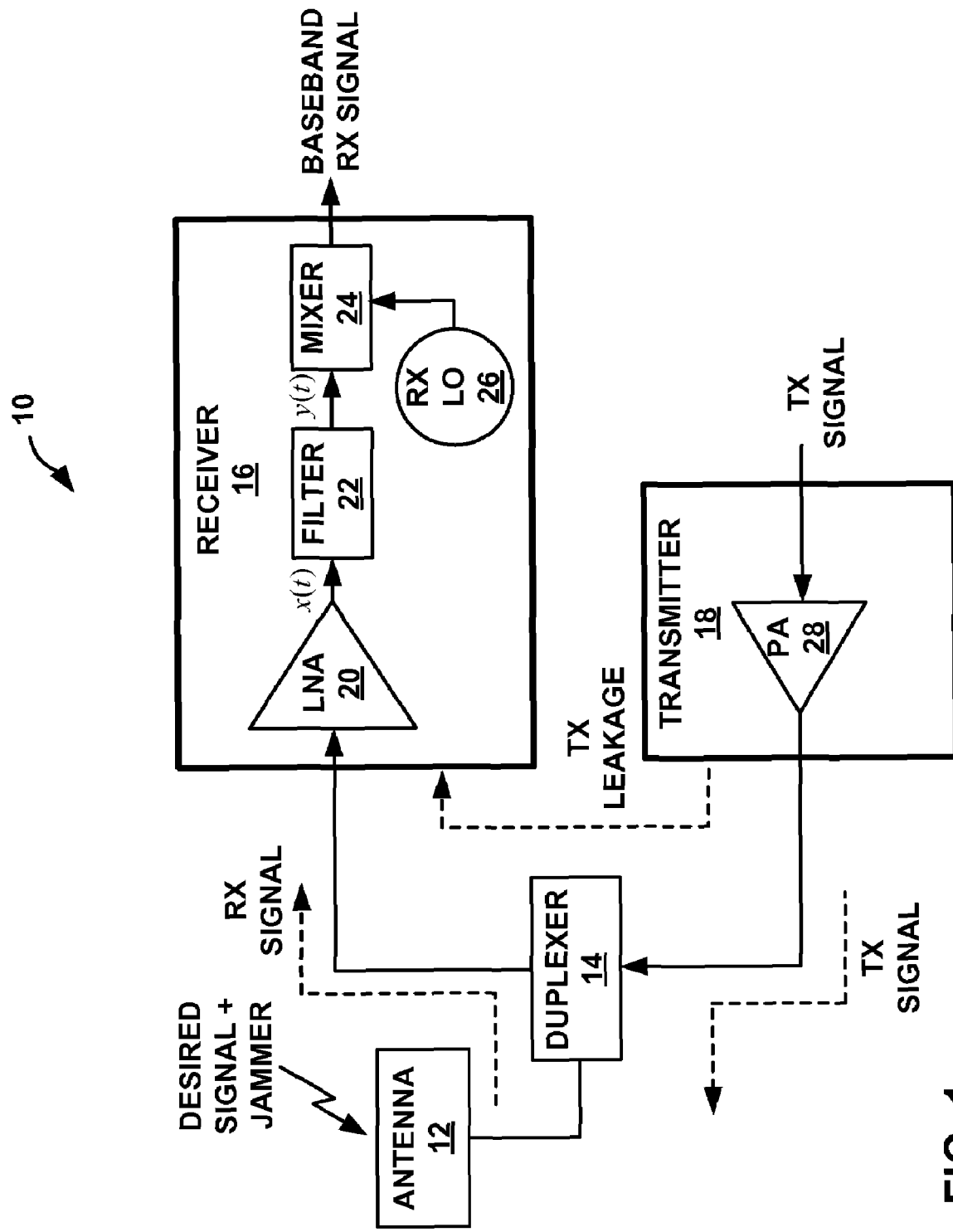
FIG. 1 is a block diagram illustrating an exemplary RF portion of a wireless communication device.

In general, this disclosure describes adaptive filter techniques for reducing adverse effects of transmit (TX) signal leakage in the receive (RX) signal path of a full-duplex, wireless communication device. In particular, the disclosure describes techniques for reducing adverse effects of second order distortion and cross-modulation distortion of TX signal leakage from a transmitter via a duplexer. The techniques may be effective in rejecting at least a portion of a TX leakage signal, thereby reducing or eliminating distortion of TX signal leakage.

In accordance with various aspects of this disclosure, a wireless receiver may include an adaptive filter that cancels at least a portion of a TX leakage signal present in an RX input signal. The adaptive filter may include an estimator circuit that generates a TX leakage signal estimate. A summer subtracts the estimate from the RX input signal to cancel TX leakage and produce an RX output signal. Rejection of TX signal leakage may be expressed in terms of a TX rejection ratio (TXRR), which defines the ratio of TX leakage signal power at the adaptive filter output to TX leakage signal power at the adaptive filter input.

The estimator circuit generates the TX leakage signal estimate based on a reference signal and the RX output signal. The reference signal approximates the carrier signal used to generate the TX signal in the transmitter. Alternatively, the reference signal may be the identical carrier signal used to generate the TX signal. For example, the reference signal may be provided by the same oscillator used to produce the TX carrier signal, which may be referred to as the TX voltage controlled oscillator (VCO) or TX local oscillator (LO).

The adaptive filter may include an in-phase (I) branch and a quadrature (Q) branch that together form a transmit leakage signal estimator. Each branch receives the RX output signal as a feedback signal. The I branch receives an in-phase version of the reference signal (I reference signal), and the Q branch receives a 90 degrees delayed, quadrature version of the reference signal (Q reference signal). Each branch includes a first multiplier that multiplies the reference signal (I or Q) and the RX output signal to produce a down-converted TX leakage signal in a base frequency band, i.e., a baseband TX leakage signal. Each branch includes a low-pass filter that filters the baseband TX leakage signal to reject frequencies outside of the baseband, including the down-converted RX signal.

In each branch, a second multiplier multiplies the baseband TX leakage signal with the reference signal to produce an up-converted signal in the TX frequency band, i.e., a TX band signal at the TX carrier frequency. A first summer combines the output TX band signals from the I and Q branches to generate the TX leakage signal estimate. A second summer subtracts the TX leakage signal estimate from the received signal, e.g., at the input or output of an LNA, to cancel at least a substantial portion of the TX leakage signal passed by the duplexer. By canceling the TX leakage signal, the techniques can reduce second order distortion and cross-modulation distortion that could be produced upon down-conversion of the TX leakage signal to baseband. In some implementations, as described below, the I and Q branches may be cross-coupled, e.g., to provide additional flexibility in shaping frequency response.

As discussed above, the adaptive filter applies the TX carrier signal or an approximation of the TX carrier signal. Hence, the first multiplier in each branch (I and Q) multiplies the RX output signal by the TX carrier signal. As a result, the first multiplier down-converts the modulated TX leakage signal from the carrier frequency to DC, creating the TX leakage baseband signal. The low-pass filter is configured to reject down-converted signal components outside of the modulation band of the TX leakage signal. In this manner, the low-pass filter produces a filtered TX leakage baseband signal. The second multiplier multiplies the filtered TX leakage baseband signal by the TX carrier signal to reproduce a TX leakage signal estimate at the TX carrier frequency. The TX leakage signal estimate can then be subtracted from the RX input signal, e.g., at the input or output of the LNA, to cancel the TX leakage signal.

Notably, the adaptive filter uses the TX carrier signal as the reference signal, instead of the TX output signal. In this manner, the adaptive filter can avoid the effects of group delay caused by the duplexer. In particular, if the TX output signal were used as the reference signal, group delay between the transmit leakage signal propagating through the duplexer and the reference signal coupled directly to the adaptive filter would cause a temporal mismatch between the actual TX leakage signal modulation envelope and the TX leakage signal modulation estimate envelope. This mismatch could reduce the performance of the adaptive filter in rejecting TX signal leakage. Use of the TX carrier signal, e.g., as provided by the TX LO, mitigates the group delay problem.

An adaptive filter, as described in this disclosure, may permit the elimination of the surface acoustic wave (SAW) filter often used between the LNA and the mixer for transmit leakage signal rejection. As a result, in some implementations, by eliminating the SAW filter, the LNA-mixer interface for an RF receiver may be constructed completely on-chip, reducing packaging, size, costs, and pin requirements. Also, an adaptive filter that uses the TX carrier signal as a reference signal, as described in this disclosure, can provide TX leakage signal rejection performance that is independent of duplexer group delay. There is no need to couple the TX power amplifier (PA) output to the adaptive filter as the reference signal, eliminating the need for extra pins. Rather, in some implementations, the TX carrier signal can be obtained on-chip as the TX LO signal used by the TX modulator. In addition, without off-chip coupling, there is less degradation of transmit signal leakage rejection due to reference signal coupling. If desired, the multipliers in the adaptive filter may be implemented as mixers, helping to reduce noise.

An adaptive filter, as described in this disclosure, may be configured for use in a variety of wireless, full-duplex communication systems, and over a variety of frequency bands. Examples include the cellular band from 824 to 894 MHz, the Personal Communication System (PCS) band from 1850 to 1990 MHz, the Digital Cellular System (DCS) band from 1710 to 1880 MHz, the International Mobile Telecommunications-2000 (IMT-2000) band from 1920 to 2170 MHz, and the like. A wireless communication device equipped for the cellular band, as an example, has a transmit band of 824 to 849 MHz and a receive band of 869 to 894 MHz. The wireless communication device may have a low intermediate frequency (LIF) or zero intermediate frequency (ZIF) mixer architecture. In general, this disclosure contemplates a ZIF mixer architecture for purposes of illustration.

FIG. 1 is a block diagram illustrating an exemplary RF portion of a wireless communication device 10. As shown in FIG. 1, device 10 includes an antenna 12 that transmits and receives wireless RF signals. A duplexer 14 couples RX input signals (RX SIGNAL) received by antenna 12 to a receiver 16, and couples TX output signals (TX SIGNAL) generated by a transmitter 18 to antenna 12. Receiver 16 includes LNA 20, filter 22, mixer 24 and local oscillator (LO) 26. Transmitter 18 includes a power amplifier 28 that amplifies an output signal to produce the TX signal for transmission via duplexer 14 and antenna 12. Transmitter 18 also may include modem, digital-to-analog converter, mixer and filter circuitry (not shown) to modulate and filter the output signal, and up-convert the signal from a baseband to a transmit band.

In receiver 16, LNA 20 amplifies the RX input signal. Filter 22 rejects interferences outside of the RX band, including TX signal leakage received via duplexer 14. Mixer 24 multiplies the filtered signal with the RX LO frequency to down-convert the desired RX signal to baseband, thereby producing an RX baseband signal. Receiver 16 may further include a baseband filter after mixer 24, as well as an analog-to-digital converter and modem (not shown) to demodulate the desired RX signal.

Antenna 12 may receive both a desired signal and a jammer signal, as shown in FIG. 1. Hence, LNA 20 may receive an RX signal including the desired signal and possibly a jammer signal, as well as the TX leakage signal from the transmit path via duplexer 14. LNA 20 amplifies the combined input signal to produce an amplified RF signal, x(t). Filter 22 receives and filters the amplified RF signal to remove interferences outside of the RX band, and produces a filtered RF signal, y(t). The interferences outside the RX band may include the TX leakage signal. Mixer 24 mixes the filtered RF signal with the RX local oscillator (LO) signal to down-convert the filtered RF signal. The desired RX signal is thereby down-converted to the RX baseband. The desired RX baseband signal, which may be filtered by a baseband filter, forms an input signal for analog-to-digital (ADC) and demodulation circuitry.

FIGS. 2A through 2C are frequency versus amplitude plots illustrating distortion due to TX signal leakage within the receive path of the device of FIG. 1. Frequency is on the horizontal axis, and amplitude is on the vertical axis. FIG. 2A shows the signal received by antenna 12. The received signal may include desired signal 30 and jammer signal 31. Jammer signal 31 is an undesired signal that corresponds to a signal generated from a nearby source such as a wireless base station. In some cases, jammer signal 31 may have an amplitude that is much higher than that of the desired signal and may be located close in frequency to the desired signal.

FIG. 2B shows the received signal at the input of LNA 20 via duplexer 14. The signal coupled by duplexer 14 contains desired signal 30 and jammer signal 31 in the RX band as well as a TX leakage signal 32 from the transmit path. TX leakage signal 32 may have a large amplitude relative to the desired signal because the transmit signal produced by power amplifier 28 is often much larger in amplitude than the desired signal. TX leakage signal 32 is outside the RX band. However, TX leakage signal 32 still may cause undesirable distortion, as explained below.

FIG. 2C shows the receive signal at the output of LNA 20. Non-linearity in LNA 20 can cause the modulation of TX leakage signal 32 to be transferred to narrow-band jammer 31 resulting in a widened spectrum 34 around the jammer. This spectral widening 34 is referred to as cross modulation distortion (XMD). As shown in FIG. 2C, a portion 36 of widened spectrum 34, shown with shading may fall within the band of desired signal 30. Portion 36 acts as additional noise that degrades the performance of the wireless communication device. This noise degrades sensitivity so that the smallest desired signal that can be reliably detected by receiver 16 needs to have a larger amplitude. XMD can also be generated in mixer 24 if filter 22 is ineffective.

In many receivers, to alleviate XMD due to jammers and TX signal leakage, filter 22 is a SAW filter. SAW filters are characterized by sharp transition band edges and large attenuation of received components outside the RX band. For this reason, SAW filters are often used to reject TX leakage signal at the input of mixer 24, which then reduces the amount of XMD generated by the mixer. Unfortunately, the use of an RF SAW filter for TX leakage signal filtering has several disadvantages. For example, the SAW filter ordinarily must be implemented off-chip, relative to LNA 20 and mixer 24, requiring matching circuits, additional package pins and cost. In addition, the SAW filter and associated discrete components typically require additional board space and cost. A SAW filter also can result in insertion losses that degrade the gain and noise figure of receiver 16. An adaptive filter, in accordance with this disclosure, may be used as an alternative to a SAW filter to reject the TX leakage signal.

Figure 3:
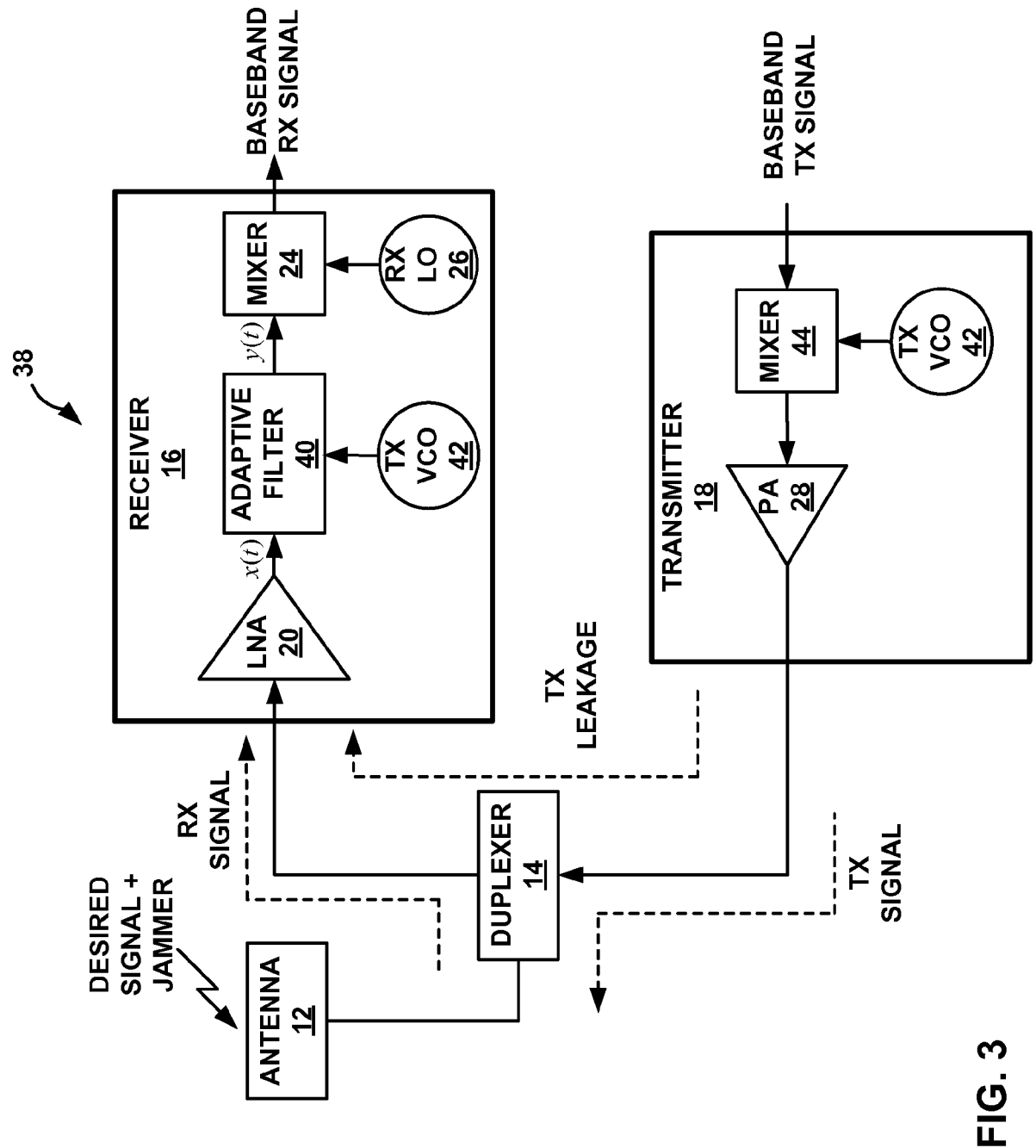
FIG. 3 is a block diagram illustrating a wireless communication device including an exemplary receiver with an adaptive filter for rejecting TX leakage in accordance with this disclosure.

FIG. 3 is a block diagram illustrating a wireless communication device 38 including an exemplary receiver 16 with an adaptive filter 40 for rejecting TX signal leakage in accordance with this disclosure. As shown in FIG. 3, device 38 may correspond substantially to device 10 of FIG. 1. Instead of a SAW filter, however, receiver 16 includes adaptive filter 40. Adaptive filter 40 makes use of a reference signal to adaptively reject TX signal leakage.

In the example of FIG. 3, the reference signal is the transmit carrier signal that is modulated in transmitter 18 to produce the TX signal.

The TX carrier signal received by adaptive filter 40 as the reference signal may be approximated or produced directly from a transmit voltage controlled oscillator (TX VCO) 42, which may be referred to as the TX LO. TX VCO 42 produces the carrier signal for transmitter 18. Hence, TX VCO 42 may be the same VCO used to produce the carrier frequency for transmitter 18 and adaptive filter 40. In other words, TX VCO 42 may be an oscillator that is coupled to both the estimator in adaptive filter 40 for generation of the TX leakage signal estimate and to a transmitter for upconversion of a TX baseband signal that produces the TX leakage signal. Mixer 44 mixes the TX carrier signal produced by TX VCO 42 with a TX baseband signal. PA 28 amplifies the resulting TX signal for transmission via duplexer 14 and antenna 12.

As will be described, adaptive filter 40 uses the TX carrier signal to extract the TX baseband signal from the signal received via duplexer 14. Adaptive filter 40 upconverts the extracted TX baseband signal to the TX carrier frequency and subtracts it from the RX signal at the input or output of LNA 20 to at least partially cancel the TX leakage signal, thereby reducing the TX leakage signal applied at those nodes. Use of the extracted baseband signal instead of the original TX baseband signal may reduce the sensitivity of the adaptive filter performance to the group delay of duplexer 14.

Figure 4A:
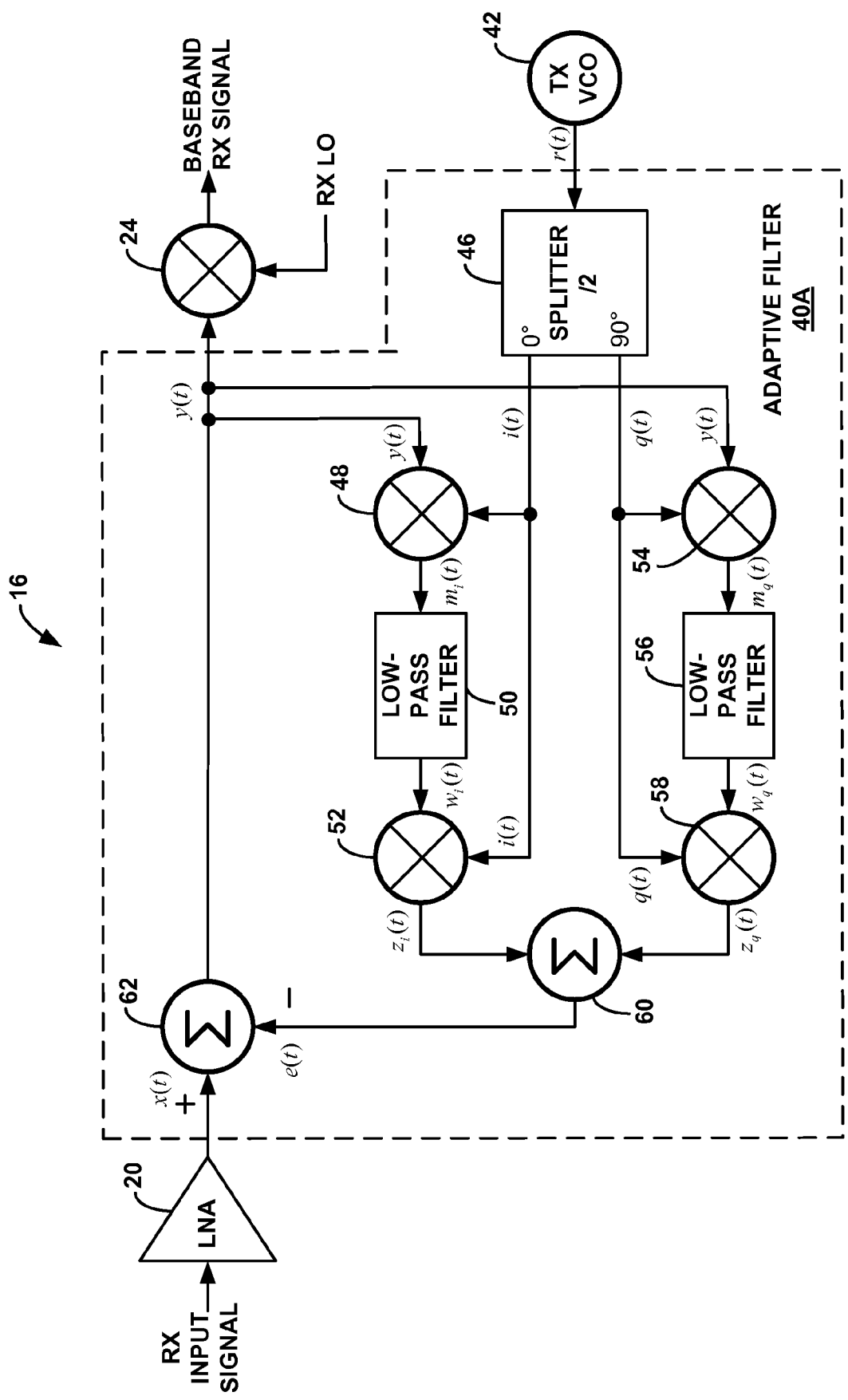
FIG. 4A is a schematic diagram illustrating an exemplary adaptive filter for rejecting TX leakage in the receiver of FIG. 3.

FIG. 4A is a schematic diagram illustrating an exemplary adaptive filter 40A for rejecting TX leakage within receiver 16 of FIG. 3. In the example of FIG. 4A, adaptive filter 40A includes a quadrature splitter 46 that receives a TX carrier signal from TX VCO 42 as a reference signal r(t). Splitter 46 produces in-phase (0 degrees) and quadrature (−90 degrees) components i(t), q(t) for application to an I branch and a Q branch, respectively, of adaptive filter 40A. Hence, the i(t) and q(t) signals respectively contain the in-phase and quadrature components of the reference signal, with the i(t) signal leading the q(t) signal by 90°. The I branch includes multiplier 48, low-pass filter 50 and multiplier 52. The Q branch includes multiplier 54, low-pass filter 56, and multiplier 58. Low pass filters 50, 56 may function, in effect, as baseband filters. A summer 60 sums the outputs $z_i(t)$, $z_q(t)$ of the I and Q branches, respectively, to produce a TX leakage signal estimate e(t).

As further shown in FIG. 4A, a summer 62 subtracts the TX leakage signal estimate e(t) from the output of LNA 20 to cancel at least a portion of the TX leakage signal from the signal x(t) produced by LNA 20. As a result, the TX signal leakage present in the signal y(t) applied to mixer 24 for down-conversion to baseband is eliminated or reduced. The signals x(t) and y(t) may be referred to as the filter input and output signals, respectively. The I and Q branches also receive the feedback signal y(t) from the output of summer 62. Adaptive filter 40A eliminates or substantially reduces the TX leakage signal available to produce second order distortion and XMD in mixer 24, thereby enhancing receiver sensitivity.

In the I branch, multiplier 48 receives and multiplies the i(t) signal with the y(t) signal and provides an $m_i(t)$ signal, which is $m_i(t)=y(t) \cdot i(t)$. Multiplying the y(t) signal by the i(t) signal down-converts the TX leakage signal to baseband, producing signal $m_i(t)$. Low-pass filter 50 in the I branch rejects signals out of the baseband of the TX signal, and produces an in-phase signal $w_i(t)$ that preserves the TX leakage baseband signal. Multiplier 52 in the I branch receives and multiplies the i(t) signal with the $w_i(t)$ signal and provides a $z_i(t)$ signal, which is $z_i(t)=w_i(t) \cdot i(t)$. Multiplying the $w_i(t)$ signal by the in-phase component of the TX carrier signal r(t) up-converts the filtered TX leakage baseband signal to the TX carrier frequency band. In this manner, the I branch produces an amplified and filtered in-phase estimate of the TX leakage signal.

Similarly, within the Q branch, multiplier 54 receives and multiplies the q(t) signal with the y(t) signal and provides an $m_q(t)$ signal, which is $m_q(t)=y(t) \cdot q(t)$. Low-pass filter 56 in the Q branch receives the $m_q(t)$ signal and rejects signals outside of the baseband of the TX signal, producing quadrature signal $w_q(t)$. Multiplier 58 receives and multiplies the q(t) signal with the $w_q(t)$ signal and provides an amplified and filtered quadrature-phase estimate signal, $z_q(t)$, which is $z_q(t) = w_q(t) \cdot q(t)$.

Summer 60 receives and sums the $z_i(t)$ and $z_q(t)$ signals and provides an estimator signal, e(t), which contains the TX leakage signal estimate. Summer 62 receives the estimator signal e(t) from summer 60 and the filter input signal x(t) from LNA 20. The filter input signal x(t) contains the received signal as well as the TX leakage signal. Summer 62 subtracts the estimator signal e(t) from the filter input signal and provides the filter output signal y(t). The subtraction cancels at least a portion of the TX leakage signal from the filter input signal x(t). The resulting filter output signal y(t) thereby reduces second order distortion and XMD of the TX leakage signal in multiplier 24.

Figure 4B:
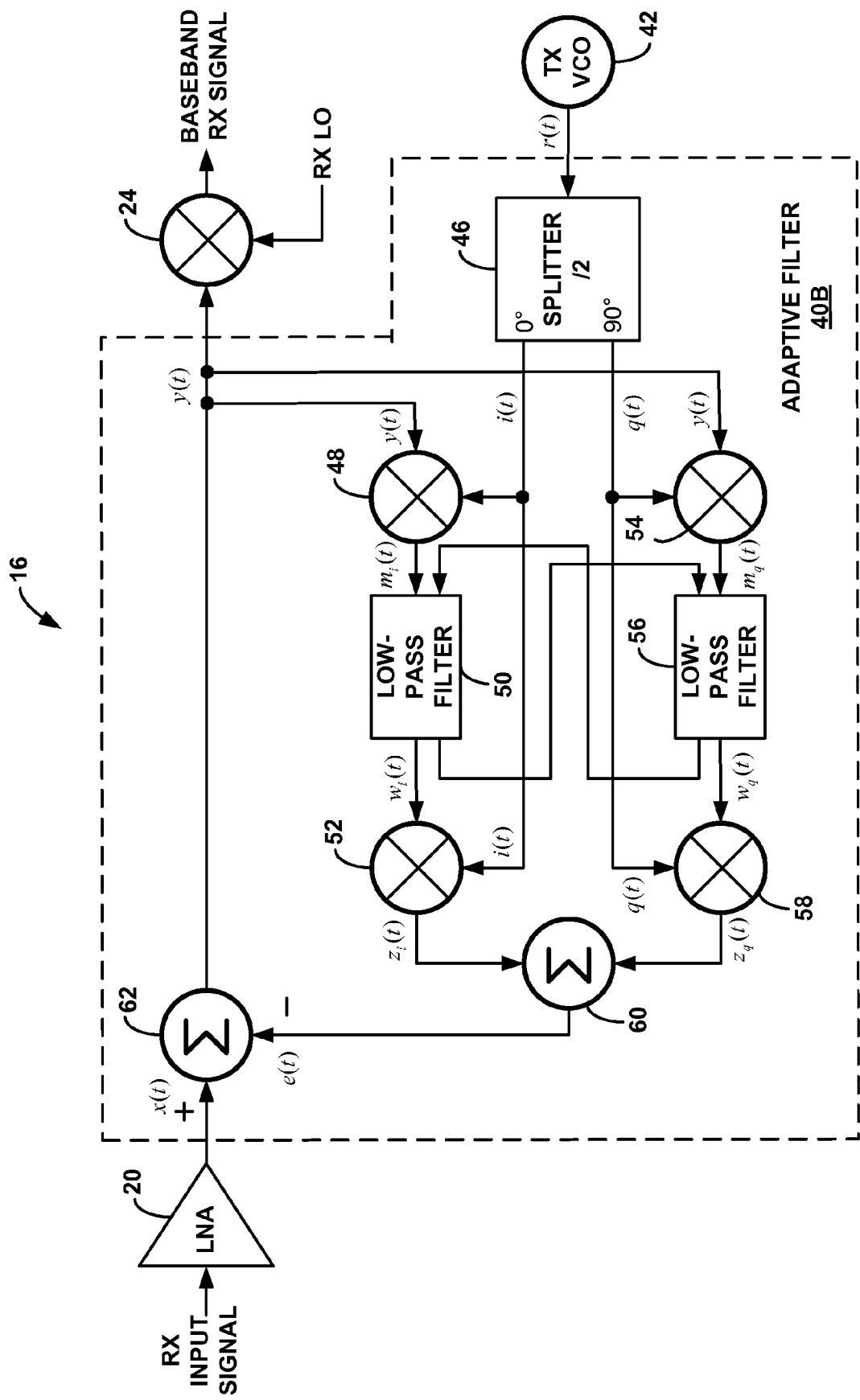
FIG. 4B is a schematic diagram illustrating an exemplary adaptive filter with cross-coupled I and Q branches for rejecting TX leakage in the receiver of FIG. 3.

In alternative implementations, the I and Q branches may be cross-coupled. FIG. 4B is a schematic diagram illustrating an exemplary adaptive filter 40B with cross-coupled I and Q branches for rejecting TX leakage in the receiver of FIG. 3. Adaptive filter 40B of FIG. 4B conforms substantially to filter 40A of FIG. 4A, except for the cross-coupling of the I and Q branches. For cross coupling, as shown in FIG. 4B, the output of low-pass filter 50 may be coupled to an input of low-pass filter 56 in the Q branch, and the output of low-pass filter 56 could be coupled to an input of low-pass filter 50 in the I branch. In particular, signal $w_q(t)$ from low-pass filter 50 may be coupled to an input of low-pass filter 56 along with the output of multiplier 54, i.e., signal $m_q(t)$, coupled to another input of the filter. Similarly, signal $w_i(t)$ from low-pass filter 56 can be coupled to an input of low-pass filter 50 along with the output of multiplier 48, i.e., signal $m_i(t)$, coupled to another input of the filter.

Figure 4C:
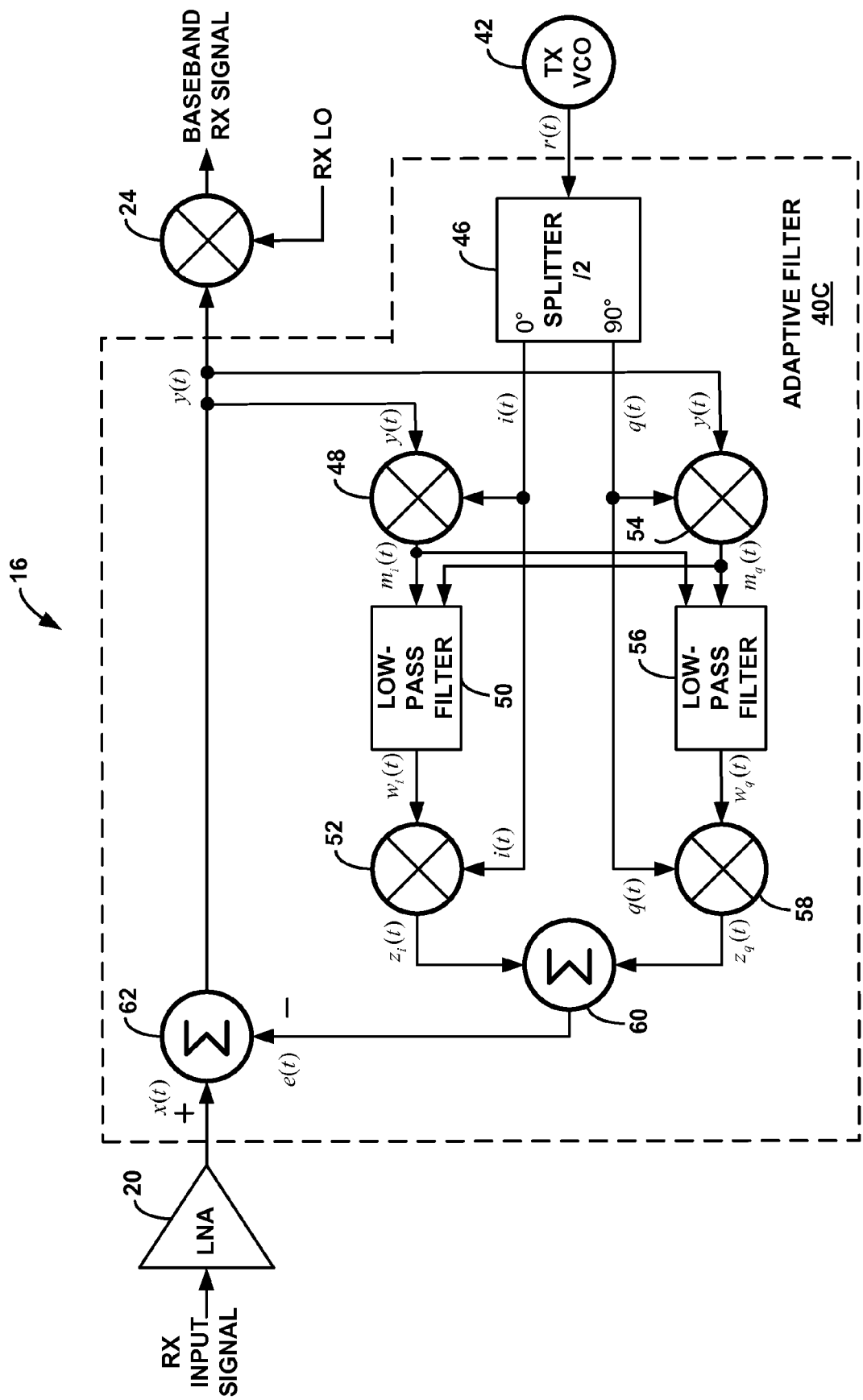
FIG. 4C is a schematic diagram illustrating another exemplary adaptive filter with cross-coupled I and Q branches for rejecting TX leakage in the receiver of FIG. 3.

FIG. 4C is a schematic diagram illustrating another exemplary adaptive filter 40C with cross-coupled I and Q branches for rejecting TX leakage in the receiver of FIG. 3. Adaptive filter 40C of FIG. 4C conforms substantially to filter 40A of FIG. 4A, except for the cross-coupling of the I and Q branches. In the example of FIG. 4C, the output of multiplier 48 may be coupled to both an input of low-pass filter 50 and an input of low-pass filter 56. Similarly, the output of multiplier 54 may be coupled to both an input of low-pass filter 56 and to an input of low-pass filter 50. Hence, each low-pass filter 50, 56 may have a first input that receives signal $m_i(t)$ from multiplier 48 and another input to receive signal $m_q(t)$ from multiplier 54. In the examples of FIGS. 4B and 4C, cross-coupling between the I and Q branches may provide low-pass filters 50, 56 with an extra degree of flexibility to further shape the filter frequency response. Each filter 50, 56 may be configured, if desired, to provide an additional shift to the cross-coupled input to more flexibly define the filter frequency response. In general, the cross-coupling structure of filters 50, 56 may vary.

In the examples of FIGS. 4A-4C, the active filter 40A-40C forms a negative feedback system. In effect, multipliers 48, 54 form downconverters that are driven by the TX local oscillator (LO) signal from TX VCO 42. Low-pass filters 50, 56 form baseband filters that reject signals out of the TX baseband. Multipliers 52, 58 form upconverters, driven by the same TX LO signal. The inverted outputs of the upconverters 52, 58 and the inputs of the downconverters 48, 54 are, in effect, connected together and to the RX signal chain. In operation, adaptive filter 40A-40C down-converts the received signal containing the TX leakage via multipliers 48, 54 using the TX LO signal. The downconverted signal is then filtered by baseband filters 50, 56, preserving the TX baseband components of the TX leakage. The resulting signal is then upconverted by multipliers 52, 58 using the TX LO and injected back into the RX signal chain with a phase and amplitude ensuring TX leakage cancellation or reduction. The correct phase and amplitude of the injected signal are generated automatically due to the nature of the negative feedback loop provided by adaptive filter 40A-40C.

In the examples of FIGS. 4A-4C, adaptive filter 40A rejects TX signal leakage independently of the group delay in duplexer 14. For adaptive filter 40A-40C to track the TX leakage envelope and accordingly modulate the reference signal, filters 50, 56 connected to the down-converting multipliers 48, 54 should have a bandwidth equal to the envelope maximum frequency. As an example, the bandwidth of filters 50, 56 may be approximately 630 kHz for CDMA1x signals.

In accordance with various aspects of this disclosure, adaptive filters 40A-40C use the TX carrier signal produced by TX VCO 42, as mentioned above, rather than the TX output signal produced by transmitter 18, as the reference signal. As a result, adaptive filters 40A-40C can provide TX leakage signal cancellation without performance limitations due to duplexer group delay. The TX carrier signal from TX VCO 42 can be readily provided and may exist on-chip with receiver 16.

The bandwidth of low-pass filters 50, 56 should be close to the TX signal bandwidth to track the TX data modulation envelope. These filters can be simply implemented as single-pole filters. In some implementations, additional poles or transmission zeros can be added to the frequency response of low-pass filters 50, 56 to provide greater attenuation at the frequency offset between the TX carrier frequency and the center frequency of the desired RX signal. This attenuation can help to reduce the noise and XMD components generated by multipliers 48 and 54 at this offset frequency and, thus, to reduce the noise and XMD of the adaptive filter. The frequency response of filters 50, 56 should be consistent with stability guidelines of closed-loop systems in the sense that the open-loop response of adaptive filter 40A-40C should provide sufficient phase margin relative to 180 degrees for 0 dB gain.

Although the components in FIGS. 4A, 4B and 4C are shown as single-ended, adaptive filters 40A-40C, LNA 20, or both may be implemented with differential inputs and outputs. Accordingly, single-ended components may be shown for ease of illustration without limitation as to possible differential implementations, if desired.

Figure 5:
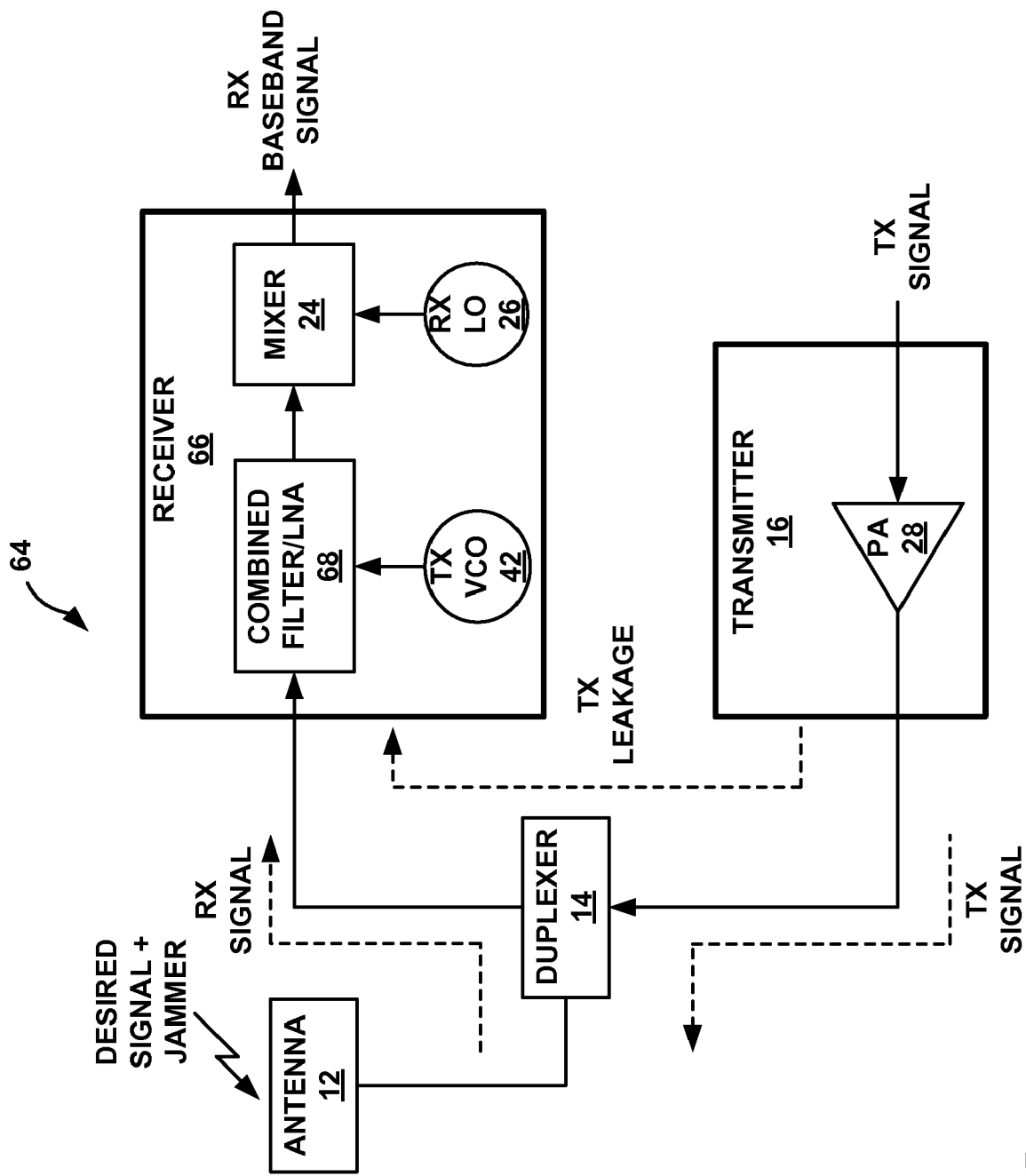
FIG. 5 is a block diagram illustrating a wireless communication device including an exemplary receiver with a combined adaptive filter/LNA for rejecting TX leakage in accordance with this disclosure.

FIG. 5 is a block diagram illustrating a wireless communication device 64 including another exemplary receiver 66 with a combined adaptive filter/LNA 68 for rejecting TX leakage in accordance with this disclosure. In the example of FIG. 5, device 64 corresponds substantially to device 38 of FIG. 3. However, device 64 includes an alternative receiver 66 in which an LNA and adaptive filter are formed together as combined filter/LNA 68. Combined filter/LNA 68 rejects TX leakage at the LNA input, rather than the LNA output. The combination of the LNA and the adaptive filter may relax IIP3 (third-order intercept point) requirements of the LNA, and may reduce current consumption in the adaptive filter. In addition, using the LNA as part of the adaptive filter loop facilitates a high open-loop gain and, thus, a high transmit rejection ratio (TXRR). Combining the LNA with the adaptive filter may cause LNA noise figure (NF) degradation. However, the LNA can be designed for reduced NF to counteract noise contributions of the adaptive filter.

Figure 6:
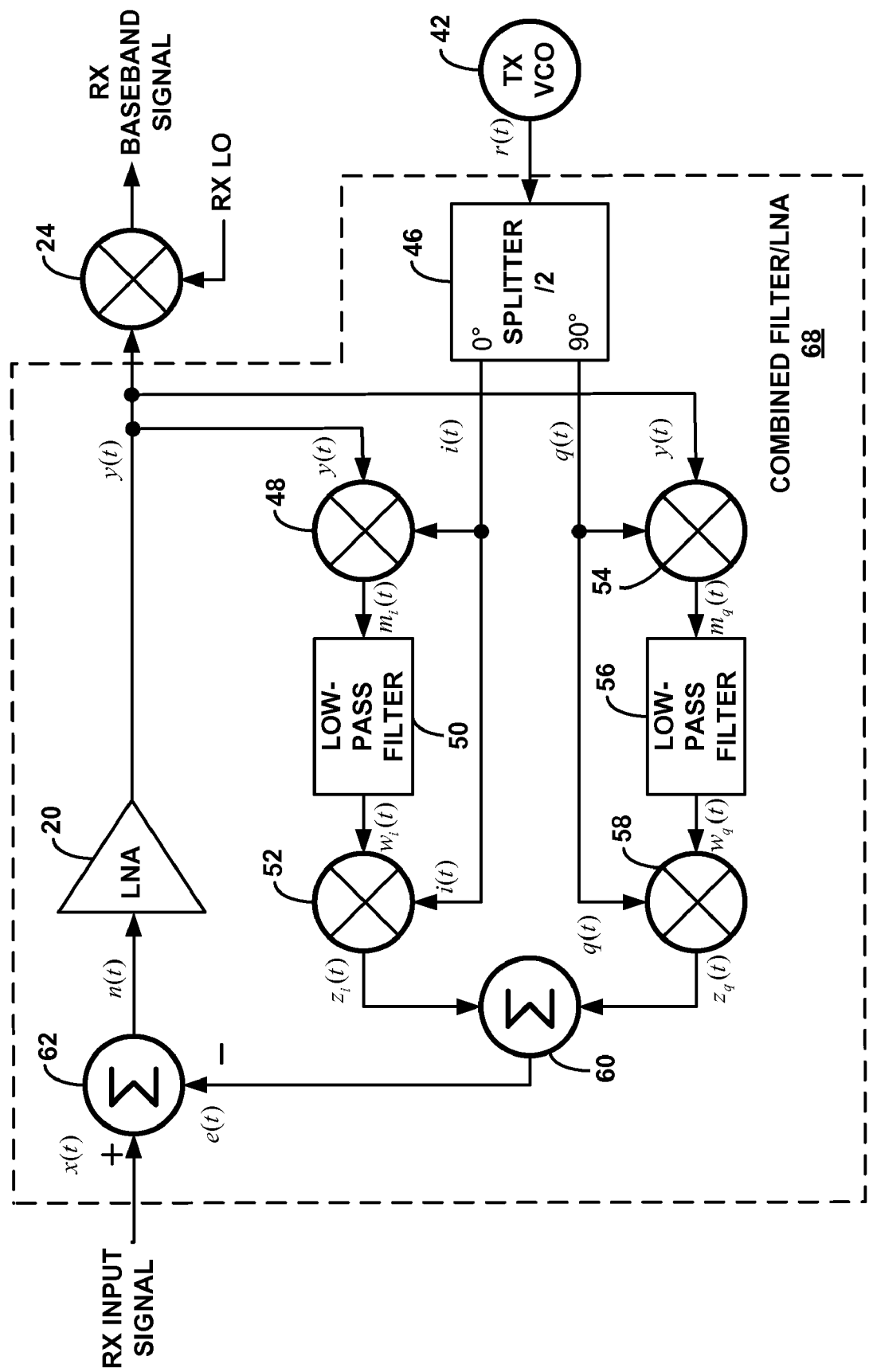
FIG. 6 is a schematic diagram illustrating an exemplary combined filter/LNA for rejecting TX leakage in the receiver of FIG. 5.

FIG. 6 is a schematic diagram illustrating an exemplary combined filter/LNA 68 for rejecting TX leakage in the receiver 64 of FIG. 5. Combined filter/LNA 68 may include all of the components of adaptive filter 40A of FIG. 4A plus LNA 20. However, the arrangement of the components is different so that TX signal leakage can be rejected at the input of LNA 20 rather than the output. For example, as shown in FIG. 6, summer 62 is arranged to subtract the TX leakage signal estimate e(t) from the incoming RX signal x(t) at the input of LNA 20. In this way, the TX leakage signal is cancelled or reduced prior to amplification by LNA 20.

Like adaptive filter 40A of FIG. 4A, adaptive filter 68 includes a quadrature splitter 46 that receives a TX carrier signal from TX VCO 42 as a reference signal r(t). Splitter 46 produces I and Q components i(t), q(t) for application to I and Q branches, respectively. The I branch includes multiplier 48, low-pass filter 50 and multiplier 52. The Q branch includes multiplier 54, low-pass filter 56, and multiplier 58.

Summer 60 sums the outputs $z_i(t)$, $z_q(t)$ of the I and Q branches, respectively, to produce a TX leakage signal estimate e(t). Summer 62 subtracts the TX leakage signal estimate e(t) from the RX signal to cancel at least a portion of the TX leakage signal from the filter input signal x(t), which is obtained from duplexer 14. Summer 62 applies the resulting signal n( )t) to the input of LNA 20. LNA 20 amplifies signal n(t) and produces the filter output signal y(t). The filter output signal y(t) also serves as a feedback signal applied to the inputs of multipliers 48 and 54.

With combined filter/LNA 68, the TX signal leakage present in the signal y(t) applied to mixer 24 for down-conversion to baseband is eliminated or reduced. The signals x(t) and y(t) may be referred to as the filter input and output signals, respectively. The I and Q branches also receive the feedback signal y(t) from the output of summer 62. Adaptive filter 40A eliminates or substantially reduces the TX leakage signal available to produce second order distortion and XMD in mixer 24, thereby enhancing receiver sensitivity.

As in the example of FIG. 4A, multiplier 48 of combined filter/LNA 68 receives and multiplies the i(t) signal with the feedback signal y(t) and provides the $m_i(t)$ signal, which is down-converted to the TX base band. Low-pass filter 50 in the I branch rejects signals out of the baseband of the TX signal, and produces in-phase signal $w_i(t)$. Multiplier 52 in the I branch receives and multiplies the i(t) signal with the $w_i(t)$ signal and provides a $z_i(t)$ signal, which is up-converted to the TX carrier band. Similarly, within the Q branch, multiplier 54 receives and multiplies the q(t) signal with the y(t) signal to produce the $m_q(t)$ signal, which is down-converted to the TX baseband.

Low-pass filter 56 in the Q branch receives the $m_q(t)$ signal and rejects signals outside of the baseband of the TX signal, producing quadrature signal $w_q(t)$. Multiplier 58 in combined filter/LNA 68 then receives and multiplies the q(t) signal with the $w_q(t)$ signal and provides a $z_q(t)$ signal, which is up-converted to the TX carrier band. Summer 60 receives and sums the $z_i(t)$ and $z_q(t)$ signals and provides the estimator signal, e(t), which is subtracted from the RX signal x(t) at the input of LNA 20 by summer 62.

As mentioned with respect to FIGS. 4B and 4C, the I and Q branches can be cross-coupled in some alternative implementations. For example, in combined filter/LNA 68 of FIG. 6, the output of low-pass filter 50 could be coupled to an input of low-pass filter 56 and the output of low-pass filter 56 could be coupled to an input of low-pass filter 50, in a manner similar to FIG. 4B. Alternatively, as in FIG. 4C, the output of multiplier 48 in FIG. 6 could be coupled to both an input of low-pass filter 50 and an input of low-pass filter 56, and the output of multiplier 54 could be coupled to both an input of low-pass filter 56 and an input of low-pass filter 50.

Figure 7:
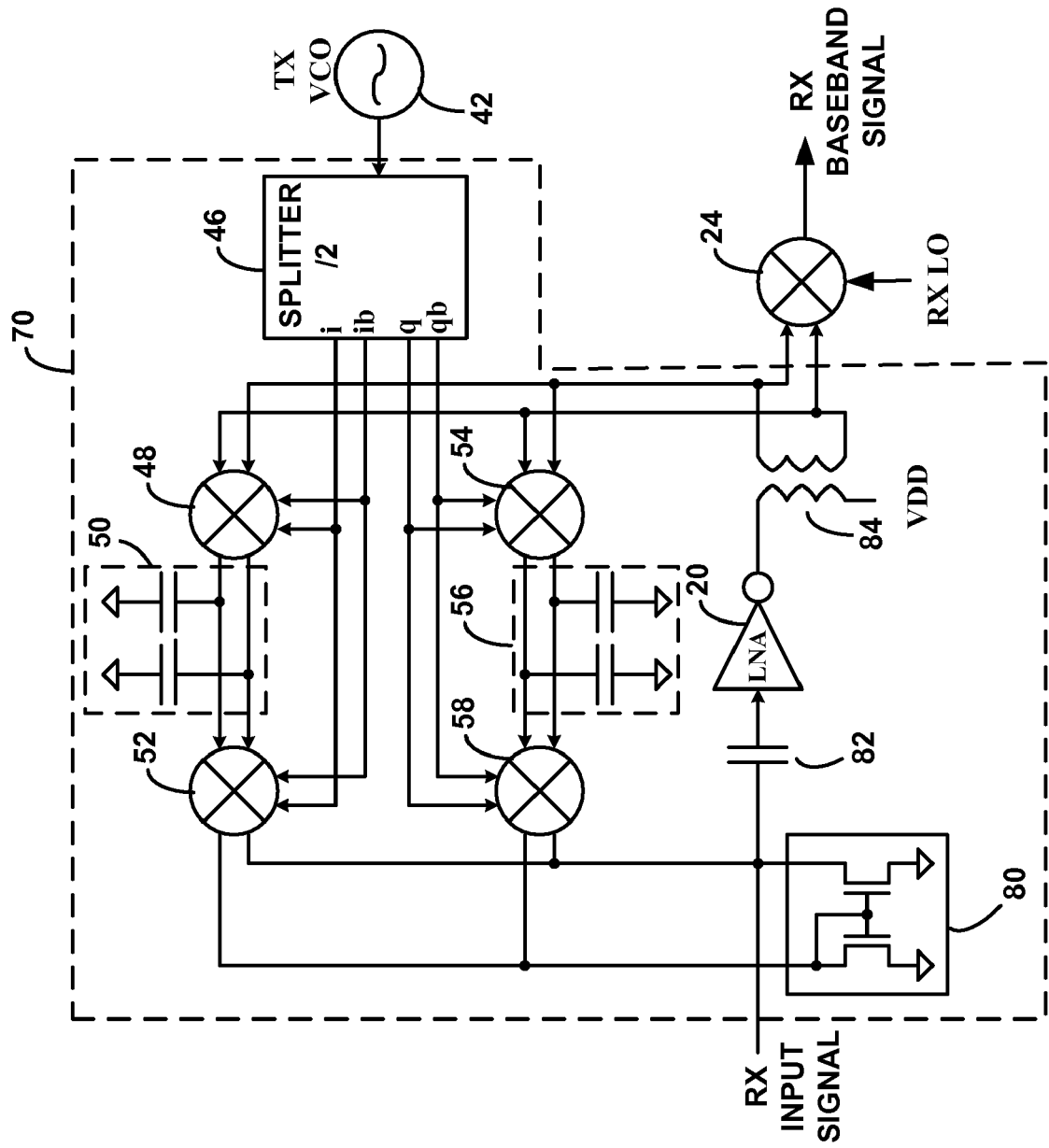
FIG. 7 is a schematic diagram illustrating an exemplary combined filter/LNA including active differential-to-single ended conversion for use with a single-ended LNA.

FIG. 7 is a schematic diagram illustrating an exemplary combined filter/LNA 70 including an active differential-to-single ended converter for use with a single-ended LNA 20. As discussed above, an adaptive filter or a combined filter/LNA may be chosen for TX signal leakage cancellation in accordance with various aspects of this disclosure. If the combined filter/LNA is chosen, and the LNA is single-ended, the combined filter/LNA may generally require a differential-to-single-ended converter for its outputs. In the example of FIG. 7, combined filter/LNA 70 includes transistor pair 80, capacitor 82 and inductive coupler 84. Combined filter/LNA 70 generally conforms to combined filter/LNA 68 of FIG. 6. However, FIG. 7 further illustrates a differential architecture.

For example, FIG. 7 shows differential outputs i, $i_b$, q, and $q_b$ of splitter 46. The outputs i and ib represent differential positive and negative in-phase components on the TX carrier signal produced by TX VCO 42. Similarly, the outputs q and $q_b$ represent differential positive and negative quadrature components of the TX carrier signal. Multipliers 48, 52 receive both in-phase components i and $i_b$, and multipliers 54, 58 receive both quadrature components q and $q_b$. Baseband filters 50 and 56 may include a pair of capacitors, one on each of the differential outputs of multipliers 48, 54, respectively.

The positive differential outputs of each multiplier 52, 58 are coupled together and to a first end of transistor pair 80. Similarly, the negative differential outputs of multipliers 52, 58 are coupled together and to the second end of transistor pair 80. The second end of transistor pair 80 is also coupled to receive the RX signal x(t). Transistor pair 80 subtracts the output of multipliers 52, 58 from the RX input signal x(t). LNA 20 amplifies the single-ended input signal provided at the second end of transistor pair 80, and applies the resulting single-ended output signal y(t) to inductive coupler 84. Inductive coupler 84 converts the single-ended output signal y(t) to a differential signal that is applied to mixer 24 and to the inputs of multipliers 48, 54.

Figure 8:
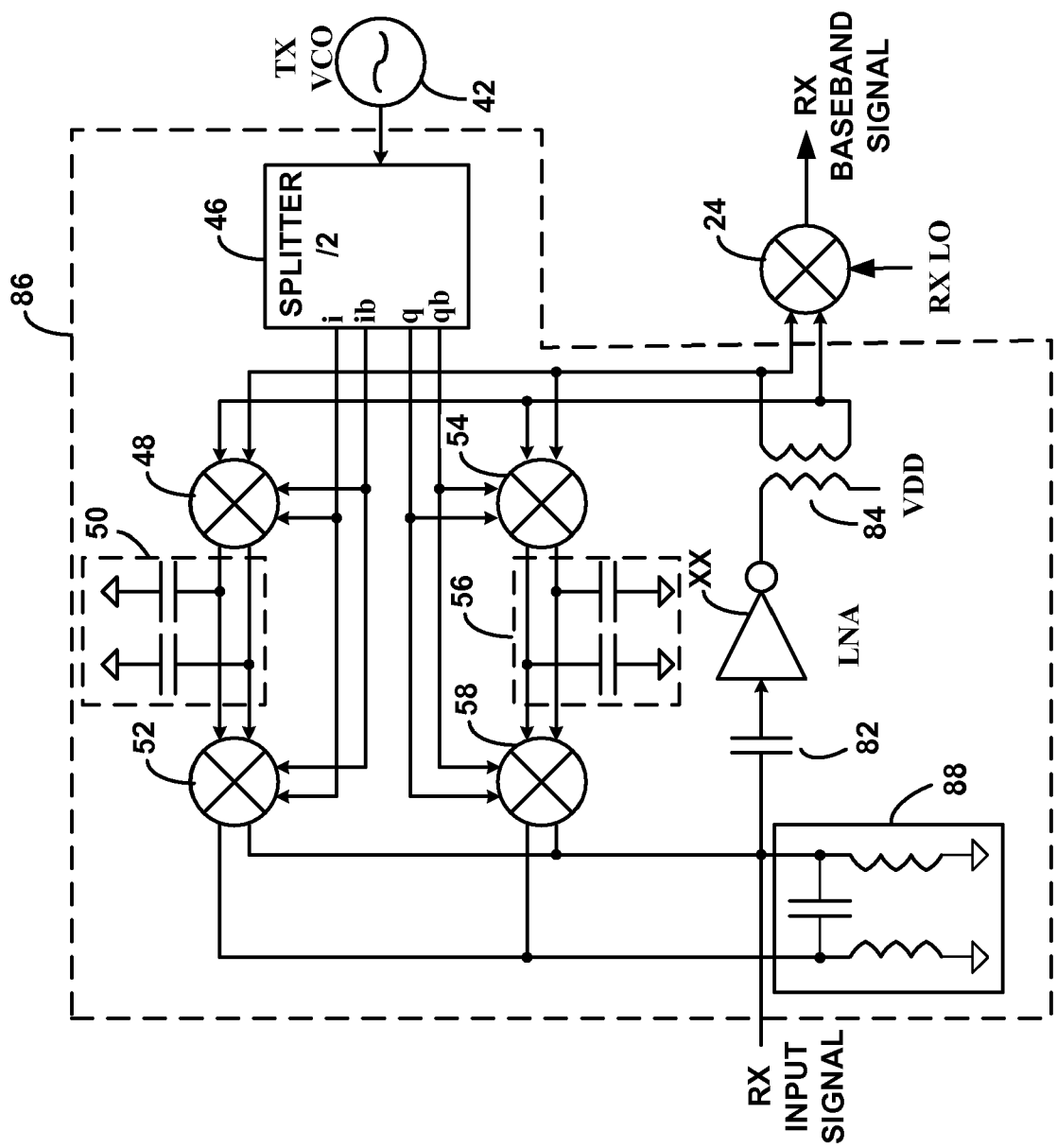
FIG. 8 is a schematic diagram illustrating an exemplary combined filter/LNA including passive differential-to-single ended conversion for use with a single-ended LNA.

FIG. 8 is a schematic diagram illustrating an exemplary combined filter/LNA 86 including a passive differential-to-single ended converter for use with a single-ended LNA 20. Combined filter/LNA 86 in the example of FIG. 8 corresponds almost identically to combined filter/LNA 70 of FIG. 7. Instead of active transistor pair 80, however, combined filter/LNA 86 includes a passive circuit 88 in the form of a pair of inductors with a cross-coupled capacitor. This passive implementation offers an alternative to the active implementation of FIG. 8.

Figure 9:
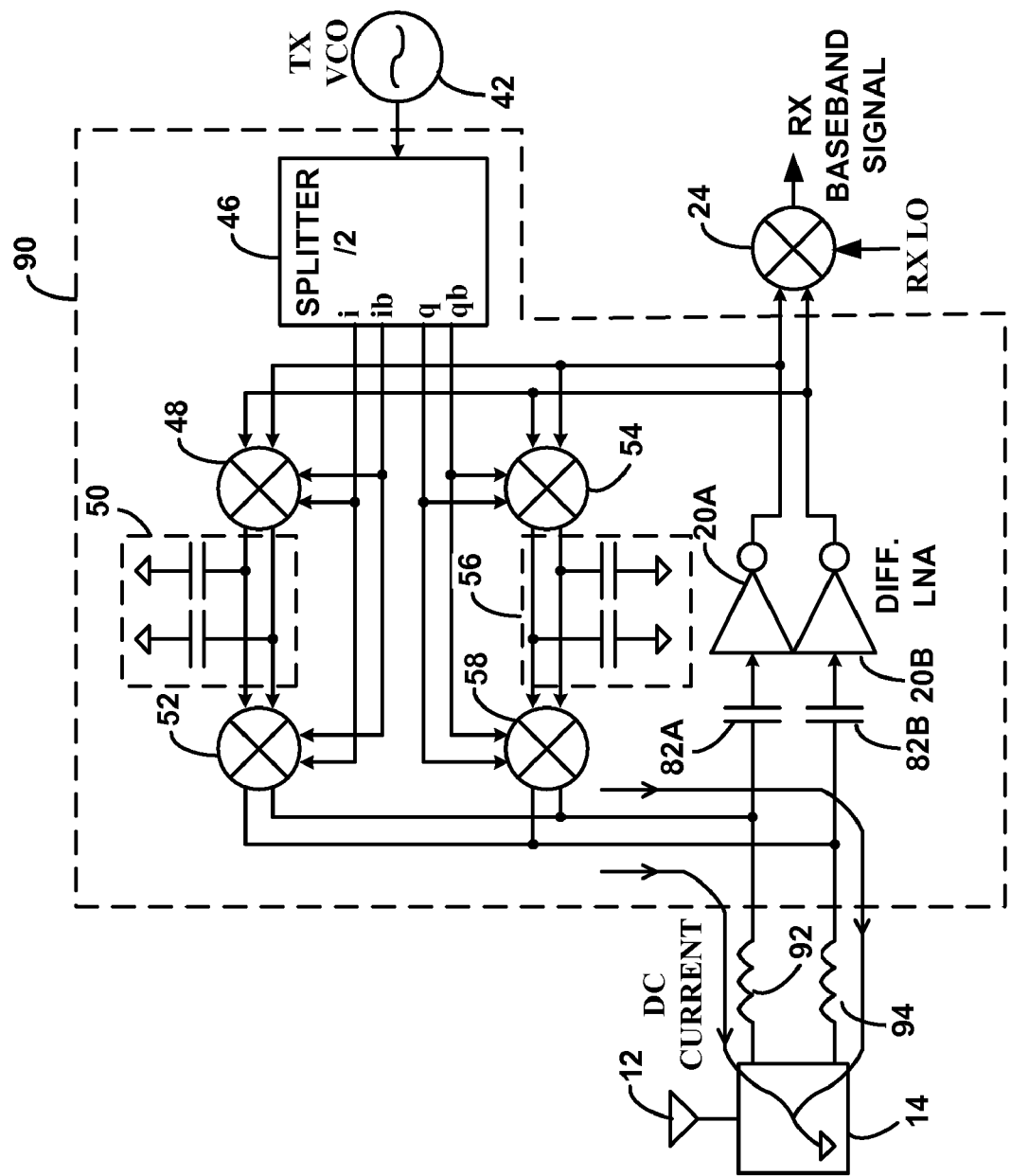
FIG. 9 is a schematic diagram illustrating an exemplary combined filter/LNA for use with a differential LNA.

FIG. 9 is a schematic diagram illustrating another exemplary combined filter/LNA 90 for use with a differential LNA 20A, 20B. Combined filter/LNA 90 conforms substantially to combined filter/LNA 70 and combined filter/LNA 86 of FIGS. 7 and 8. However, combined filter/LNA 90 includes differential LNA 20A, 20B, inductors 92, 94, and capacitors 82A, 82B. If the LNA is differential, a single-ended-to-differential converter is not needed. However, the differential LNA 20A, 20B may be coupled to a duplexer 14 with balanced RX ports. In addition, it may be desirable to provide DC return paths to ground in duplexer 14 for the outputs of the TX cancellation components. As shown in FIG. 9, for example, duplexer 14 may be coupled to the inputs of differential LNA 20A and 20B via respective inductors 92, 94 and capacitors 82A, 82B. The differential outputs of differential LNA 20A, 20B are coupled to differential inputs of mixer 24.

Figure 10:
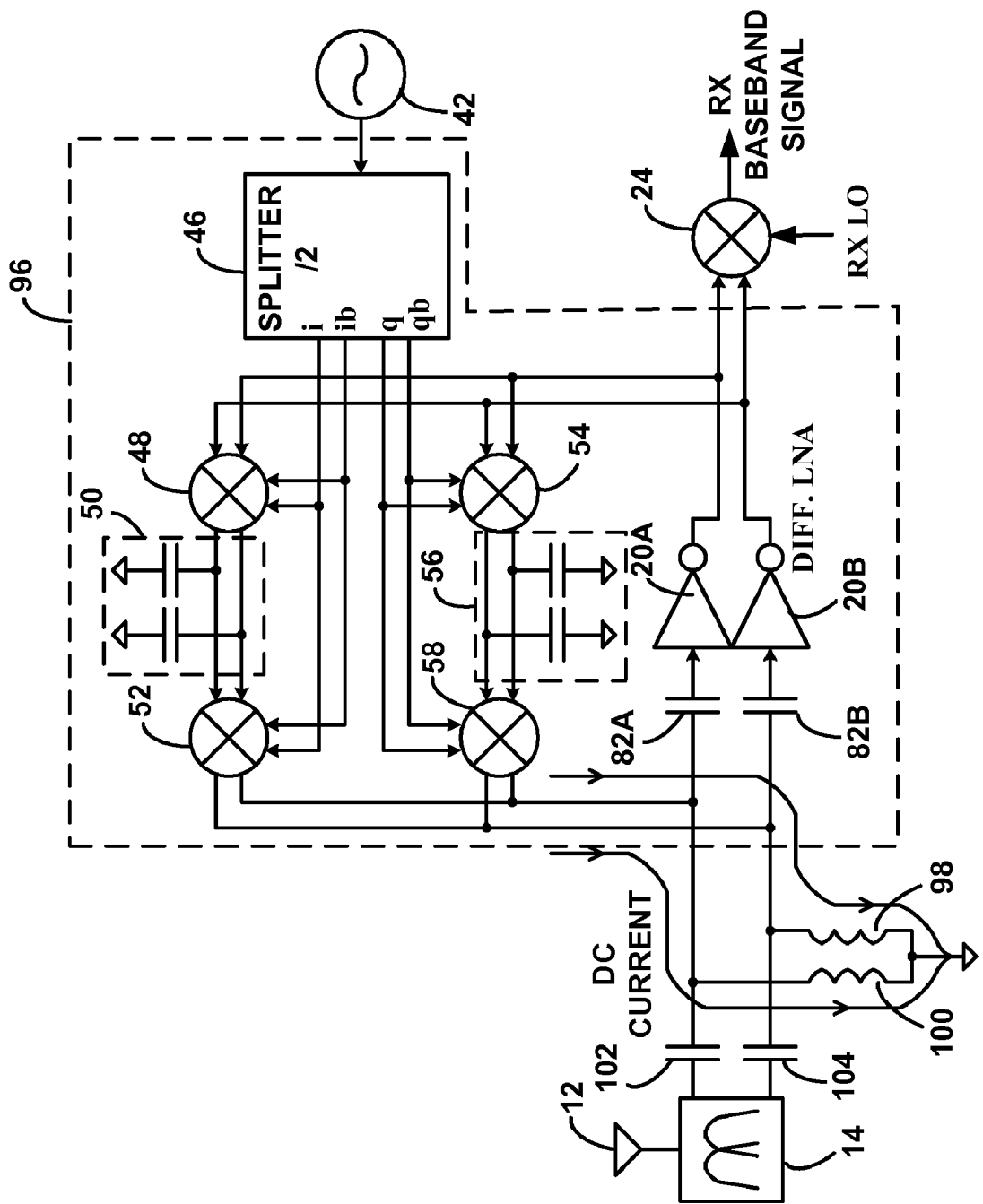
FIG. 10 is another schematic diagram illustrating an exemplary combined filter/LNA for use with a differential LNA.

FIG. 10 is a schematic diagram illustrating an exemplary combined filter/LNA 96 for use with a differential LNA 20A, 20B. Combined filter/LNA 96 represents an alternative to combined filter/LNA 90 of FIG. 9. However, the differential RX ports of duplexer 14 are coupled to the inputs of LNAs 20A, 20B via capacitors 102, 82A and 104, 82B. DC current flows from the outputs of multipliers 52, 58 to ground via inductors 98, 100.

Figure 11:
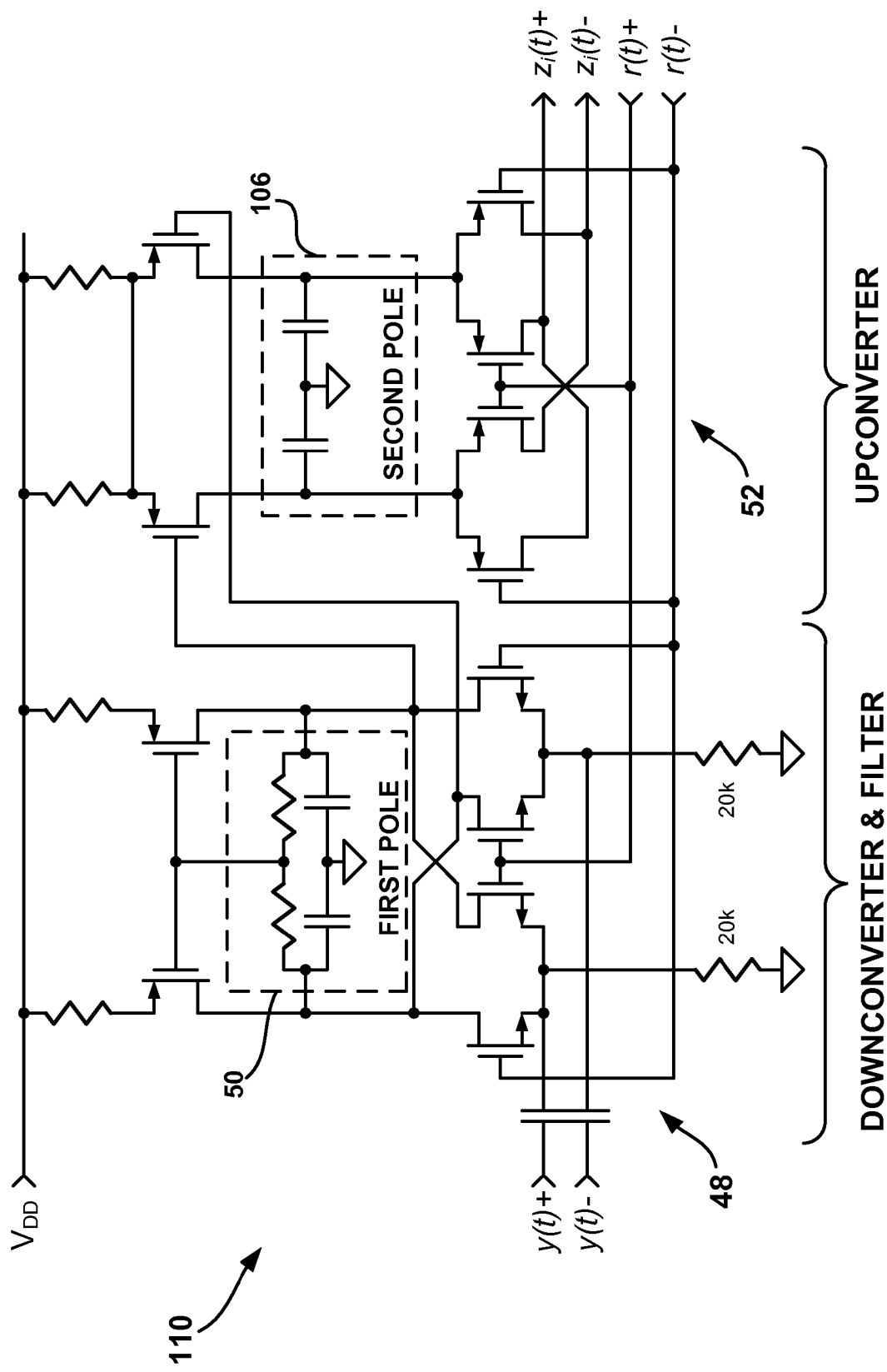
FIG. 11 is a schematic diagram illustrating an exemplary branch of an adaptive filter in greater detail.

FIG. 11 is a schematic diagram illustrating an exemplary branch 110 of an adaptive filter 40 in greater detail. In the example of FIG. 1, branch 110 is an I branch with a multiplier 48 having differential inputs that receive positive and negative reference signal components r(t)+ and r(t)−, e.g., from TX VCO 42, and positive and negative filter output signal components y(t)+ and y(t)−. The DC bias of the reference signals may be zero volts. Multiplier 48 downconverts the filter input signal y(t) to the TX baseband. Low pass filter 50 provides a first pole for the frequency response of branch 110, and rejects signals outside of the TX baseband.

Multiplier 52 receives the output of multiplier 48 and low pass filter 50, and upconverts the output to the TX carrier band to produce I branch differential outputs $z_i(t)+$ and $z_i(t)−$ for summation with Q branch outputs, and ultimate subtraction from the filter input signal x(t) to cancel TX signal leakage. A second pole also may be provided by a filter 106 in multiplier 52 to suppress noise caused by multiplier 48 and filter 50. FIG. 11 shows various resistors, capacitors and transistors for purposes of illustration of an example implementation of a branch within adaptive filter 40. The arrangement of such components in FIG. 11 serves as an example and should not be considered limiting of the subject matter broadly described in this disclosure.

An adaptive filter, as described in this disclosure, whether embodied alone or in combination with an LNA may generate its own XMD around a jammer, primarily in the downconverter multiplier 48. This XMD appears at the output of down-converter multiplier 48 at the frequency equal to the offset frequency between the jammer RF frequency and the TX carrier frequency. Filter 50 attenuates the XMD together with the jammer and multiplier 52 upconverts the XMD from the jammer-TX offset frequency back to the jammer RF frequency. If the jammer RF frequency is close to the desired RX signal frequency, the XMD generated by the adaptive filter can contaminate the band of the desired signal. In order to reduce the XMD of a jammer close to the desired RX signal, the low pass filter 50 may be constructed to have sufficient attenuation at the offset between the TX carrier frequency and the center frequency of the desired RX signal. This attenuation can be achieved by reducing the first pole frequency (50 in FIG. 11) and/or adding a second pole (106 in FIG. 11) before the RX-TX offset frequency.

Figure 12:
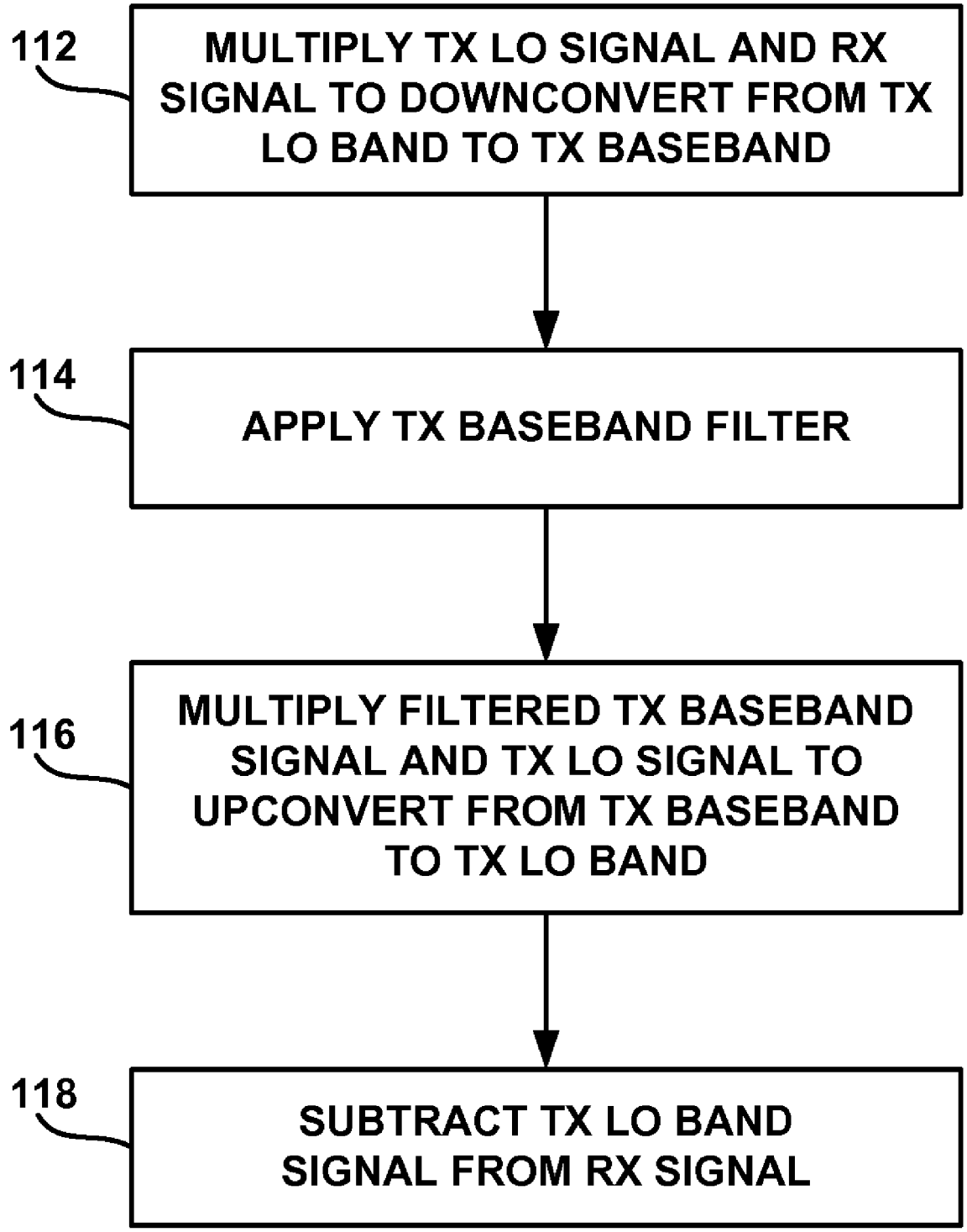
FIG. 12 is a flow diagram illustrating an adaptive filtering technique for eliminating or reducing transmit signal leakage.

FIG. 12 is a flow diagram illustrating an adaptive filtering technique for eliminating or reducing transmit signal leakage. As shown in FIG. 12, the adaptive filtering technique may include multiplying a TX LO signal and an RX signal to downconvert TX signal leakage from the TX LO band to the TX baseband (112). Upon applying a TX baseband filter (114), the filtered TX baseband signal is multiplied with the TX LO signal to upconvert the TX leakage signal from the TX baseband to the TX LO band (116). Then, the upconverted TX leakage in the TX LO band is subtracted from the RX signal to cancel at least a portion of the TX leakage in the RX signal (118). The technique illustrated in FIG. 12 may be implemented using any of the components and arrangements described in this disclosure.

Adaptive filtering techniques as described in this disclosure can be used not only in primary RX paths, but also in diversity RX and global positioning satellite (GPS) RX paths to relax the linearity requirements of corresponding LNAs and mixers.

Adaptive filters, as described herein, may be used for various systems and applications. For example, the adaptive filters may be used in wireless full-duplex communication systems such as cellular systems, OFDM systems, orthogonal frequency division multiple access (OFDMA) systems, multiple-input multiple-output (MIMO) systems, wireless local area networks (LANs), and the like. Full-duplex cellular systems include CDMA system and some versions of Global System for Mobile Communications (GSM) systems, and the CDMA systems include IS-95, IS-2000, IS-856, and Wideband-CDMA (W-CDMA) systems. The adaptive filters may be used for a wireless device as well as a base station in a wireless full-duplex communication system.

Some examples of full-duplex, wireless communication systems are Personal Communication System (PCS), Digital Cellular System (DCS), and International Mobile Telecommunications-2000 (IMT-2000) systems. As one particular example, the techniques may be applied in a wireless communication device equipped for code division multiple access (CDMA) communication. The receiver components described in this disclosure may be incorporated within a wireless communication device, which may further include analog-to-digital converter circuitry, a digital signal processor (DSP), a modem, and other suitable components that may be useful for transmitting, receiving, encoding and decoding data, voice or other signals. The modem may be formed, at least in part, by a DSP. The wireless communication device may be a mobile radiotelephone, a satellite phone, a mobile gaming console, a personal digital assistant (PDA), smart phone, television console, digital video or audio device, a laptop or desktop computer, a set top box, a wireless access point, a base station, or any other device equipped for wireless communication.

Adaptive filters as described herein may be implemented within an integrated circuit (IC), an RF integrated circuit, an application specific integrated circuit (ASIC), or other electronic units designed to perform the functions described herein. The adaptive filters may be fabricated with various IC process technologies such as complementary metal oxide semiconductor (CMOS), bipolar junction transistor (BJT), bipolar-CMOS (BiCMOS), silicon germanium (SiGe), gallium arsenide (GaAs), and the like.

Various aspects of the disclosure have been described. The foregoing description has been presented for the purposes of illustration, and is not intended to be exhaustive or limiting.

Many modifications and variations are possible within the scope of the following claims.

The invention claimed is:

1. A filter circuit for a radio frequency (RF) receiver, the filter circuit comprising:
a summer that receives an RF receive (RX) input signal having a transmit (TX) leakage signal, and subtracts a TX leakage signal estimate from the RX input signal to produce an RX output signal; and
an estimator that generates the TX leakage signal estimate exclusive of a TX signal and based on the RX output signal and an unmodulated reference signal at a carrier frequency of the TX leakage signal.

2. The circuit of claim 1, further comprising an oscillator that generates the reference signal at the carrier frequency, the oscillator being coupled to both the estimator for generation of the TX leakage signal estimate and to a transmitter for upconversion of a TX baseband signal that produces the TX leakage signal.

3. The circuit of claim 2, wherein the oscillator is formed on-chip with the summer and the estimator.

4. The circuit of claim 1, wherein the estimator comprises:
a first multiplier that multiplies the output signal with an in-phase component of the reference signal to generate a first-in-phase signal;
a first low pass filter that filters the first in-phase signal to generate a second in-phase signal;
a second multiplier that multiplies the second in-phase signal with the in-phase component of the reference signal to generate a third in-phase signal;
a third multiplier that multiplies the output signal with a quadrature component of the reference signal to generate a first quadrature signal;
a second low pass filter that filters the first quadrature signal to generate a second quadrature signal;
a fourth multiplier that multiplies the second quadrature signal with the quadrature component of the reference signal to generate a third quadrature signal; and
a second summer that adds the third in-phase signal and the third quadrature signal to generate the TX leakage signal estimate.

5. The circuit of claim 4, wherein the first and second low pass filters are cross-coupled.

6. The circuit of claim 4, wherein each of the first and second low pass filters is coupled to receive both the first in-phase signal and the first quadrature signal.

7. The circuit of claim 1, wherein the estimator multiplies the output signal by the reference signal to down-convert the TX leakage signal in the output signal to a TX baseband, and multiplies the down-converted TX leakage signal by the reference signal to up-convert the down-converted TX leakage signal to the carrier frequency.

8. The circuit of claim 1, wherein the summer is coupled to subtract the TX leakage signal estimate from the input signal at an input to an amplifier.

9. The circuit of claim 1, wherein the summer is coupled to subtract the TX leakage signal estimate from the input signal at an output of an amplifier.

10. The circuit of claim 1, wherein the summer is coupled to subtract the TX leakage signal estimate from the input signal at a node in a receive chain prior to a down-conversion mixer.

11. The circuit of claim 1, further comprising an amplifier that amplifies the input signal to produce the output signal.

12. The circuit of claim 1, wherein the summer is coupled to provide the output signal to a mixer that down-converts the output signal to a receive baseband.

13. A method for filtering a transmit (TX) leakage signal from a received input signal in a radio frequency (RF) receiver, the method comprising:
receiving an RF receive (RX) input signal having a TX leakage signal;
subtracting a TX leakage signal estimate from the input signal to produce an output signal; and
generating the TX leakage signal estimate exclusive of a TX signal and based on the output signal and an unmodulated reference signal at a carrier frequency of the TX leakage signal.

14. The method of claim 13, further comprising generating the reference signal at the carrier frequency from an oscillator coupled to an estimator for generation of the TX leakage signal estimate and to a transmitter for upconversion of a TX baseband signal that produces the TX leakage signal.

15. The method of claim 14, wherein the oscillator is formed on-chip with the estimator.

16. The method of claim 13, wherein generating the TX leakage signal estimate comprises:
multiplying the output signal with an in-phase component of the reference signal to generate a first-in-phase signal;
filtering the first in-phase signal to generate a second in-phase signal;
multiplying the second in-phase signal with the in-phase component of the reference signal to generate a third in-phase signal;
multiplying the output signal with a quadrature component of the reference signal to generate a first quadrature signal;
filtering the first quadrature signal to generate a second quadrature signal;
multiplying the second quadrature signal with the quadrature component of the reference signal to generate a third quadrature signal; and
summing the third in-phase signal and the third quadrature signal to generate the TX leakage signal estimate.

17. The method of claim 16, further comprising filtering the first in-phase signal with a first low-pass filter, and filtering the first quadrature signal with a second low-pass filter, wherein the first and second low pass filters are cross-coupled.

18. The method of claim 16, further comprising filtering the first in-phase signal with a first low-pass filter, and filtering the first quadrature signal with a second low-pass filter, wherein each of the first and second low pass filters is coupled to receive both the first in-phase signal and the first quadrature signal.

19. The method of claim 13, wherein generating the TX leakage signal estimate comprises multiplying the output signal by the reference signal to down-convert the TX leakage signal in the output signal to a TX baseband, and multiplying the down-converted TX leakage signal by the reference signal to up-convert the down-converted TX leakage signal to the carrier frequency.

20. The method of claim 13, further comprising subtracting the TX leakage signal estimate from the input signal at an input to an amplifier.

21. The method of claim 13, further comprising subtracting the TX leakage signal estimate from the input signal at an output of an amplifier.

22. The method of claim 13, further comprising subtracting the TX leakage signal estimate from the input signal at a node in a receive chain prior to a down-conversion mixer.

23. The method of claim 13, further comprising amplifying the input signal to produce the output signal.

24. The method of claim 13, further comprising providing the output signal to a mixer that down-converts the output signal to a receive baseband.

25. A filter circuit for a radio frequency (RF) receiver, the filter circuit comprising:
    means for receiving an RF receive (RX) input signal having a transmit (TX) leakage signal;
    means for subtracting a TX leakage signal estimate from the input signal to produce an output signal; and
    means for generating the TX leakage signal estimate exclusive of a TX signal and based on the output signal and an unmodulated reference signal at a carrier frequency of the TX leakage signal.

26. The circuit of claim 25, further comprising means for generating the reference signal at the carrier frequency from an oscillator coupled to an estimator for generation of the TX leakage signal estimate and to a transmitter for upconversion of a TX baseband signal that produces the TX leakage signal.

27. The circuit of claim 26, wherein the oscillator is formed on-chip with the estimator.

28. The circuit of claim 25, wherein the means for generating the TX leakage signal estimate comprises:
    means for multiplying the output signal with an in-phase component of the reference signal to generate a first-in-phase signal;
    means for filtering the first in-phase signal to generate a second in-phase signal;
    means for multiplying the second in-phase signal with the in-phase component of the reference signal to generate a third in-phase signal;
    means for multiplying the output signal with a quadrature component of the reference signal to generate a first quadrature signal;
    means for filtering the first quadrature signal to generate a second quadrature signal;
    means for multiplying the second quadrature signal with the quadrature component of the reference signal to generate a third quadrature signal; and
    means for summing the third in-phase signal and the third quadrature signal to generate the TX leakage signal estimate.

29. The circuit of claim 28, wherein the first and second low pass filters are cross-coupled.

30. The circuit of claim 28, wherein each of the first and second low pass filters is coupled to receive both the first in-phase signal and the first quadrature signal.

31. The circuit of claim 25, wherein the means for generating the TX leakage signal estimate comprises means for multiplying the output signal by the reference signal to down-convert the TX leakage signal in the output signal to a TX baseband, and means for multiplying the down-converted TX leakage signal by the reference signal to up-convert the down-converted TX leakage signal to the carrier frequency.

32. The circuit of claim 25, further comprising means for subtracting the TX leakage signal estimate from the input signal at an input to an amplifier.

33. The circuit of claim 25, further comprising means for subtracting the TX leakage signal estimate from the input signal at an output of an amplifier.

34. The circuit of claim 25, wherein the means for subtracting is coupled to subtract the TX leakage signal estimate from the input signal at a node in a receive chain prior to a down-conversion mixer.

35. The circuit of claim 25, further comprising means for amplifying the input signal to produce the output signal.

36. The circuit of claim 25, further comprising means for providing the output signal to a mixer that down-converts the output signal to a receive baseband.

37. A radio frequency (RF) receiver, the receiver comprising:
    an antenna that receives a receive (RX) input signal;
    an amplifier that amplifies the RX input signal;
    a duplexer that couples the RX input signal from the antenna to the amplifier, and passes a transmit (TX) leakage signal to the amplifier as part of the RX input signal;
    a summer that subtracts a TX leakage signal estimate from the RX input signal to produce an RX output signal;
    an estimator that generates the TX leakage signal estimate exclusive of a TX signal and based on the RX output signal and an unmodulated reference signal at a carrier frequency of the TX leakage signal; and
    a mixer that downconverts the RX output signal to a baseband.

38. The receiver of claim 37, further comprising an oscillator that generates the reference signal at the carrier frequency, the oscillator being coupled to both the estimator for generation of the TX leakage signal estimate and to a transmitter for upconversion of a TX baseband signal that produces the TX leakage signal.

39. The receiver of claim 38, wherein the oscillator is formed on-chip with the summer and the estimator.

40. The receiver of claim 37, wherein the estimator comprises:
    a first multiplier that multiplies the output signal with an in-phase component of the reference signal to generate a first-in-phase signal;
    a first low pass filter that filters the first in-phase signal to generate a second in-phase signal;
    a second multiplier that multiplies the second in-phase signal with the in-phase component of the reference signal to generate a third in-phase signal;
    a third multiplier that multiplies the output signal with a quadrature component of the reference signal to generate a first quadrature signal;
    a second low pass filter that filters the first quadrature signal to generate a second quadrature signal;
    a fourth multiplier that multiplies the second quadrature signal with the quadrature component of the reference signal to generate a third quadrature signal; and
    a summer that adds the third in-phase signal and the third quadrature signal to generate the TX leakage signal estimate.

41. The receiver of claim 40, wherein the first and second low pass filters are cross-coupled.

42. The receiver of claim 40, wherein each of the first and second low pass filters is coupled to receive both the first in-phase signal and the first quadrature signal.

43. The receiver of claim 37, wherein the estimator multiplies the output signal by the reference signal to down-convert the TX leakage signal in the output signal to a TX baseband, and multiplies the down-converted TX leakage signal by the reference signal to up-convert the down-converted TX leakage signal to the carrier frequency.

44. The receiver of claim 37, wherein the summer is coupled to subtract the TX leakage signal estimate from the RX input signal at an input to the amplifier.

45. The receiver of claim 37, wherein the summer is coupled to subtract the TX leakage signal estimate from the amplified input signal at an output of the amplifier.

46. The receiver of claim 37, wherein the summer is coupled to subtract the TX leakage signal estimate from the input signal at a node in a receive chain prior to a down-conversion mixer.

47. The receiver of claim 37, wherein the summer is coupled to provide the output signal to the mixer.

* * * * *